April 14, 1959
R. S. DAVIS ET AL
2,882,356
TROLLEY DUCT WITH FORMED BUS BARS
Filed May 4, 1956
3 Sheets-Sheet 3
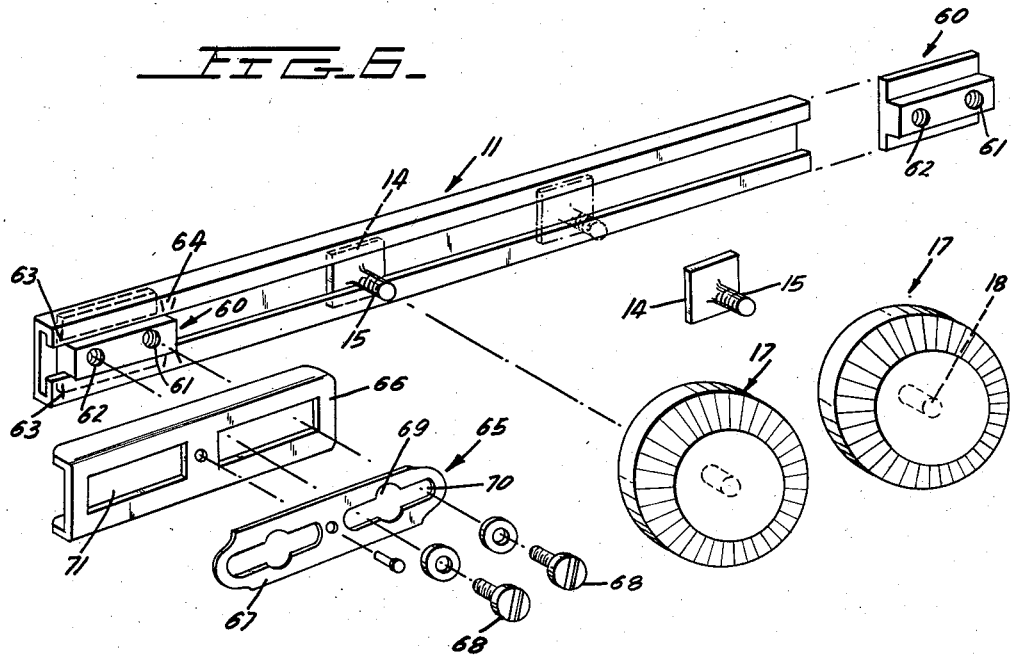
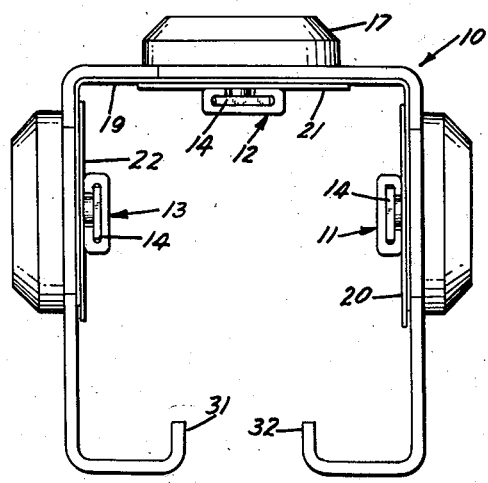
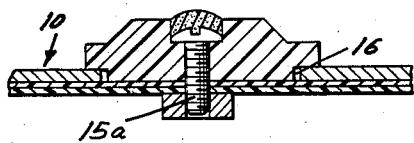
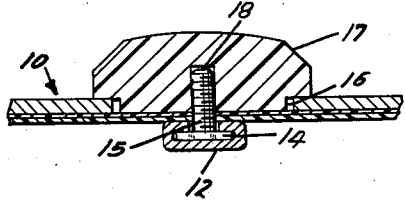
INVENTORS
RUSSELL S. DAVIS
JONAH WITTENBERG
BY
*Ostrolenk, Faber,*
*Gerb & Soffen*
ATTORNEYS

United States Patent Office 2,882,356
Patented Apr. 14, 1959

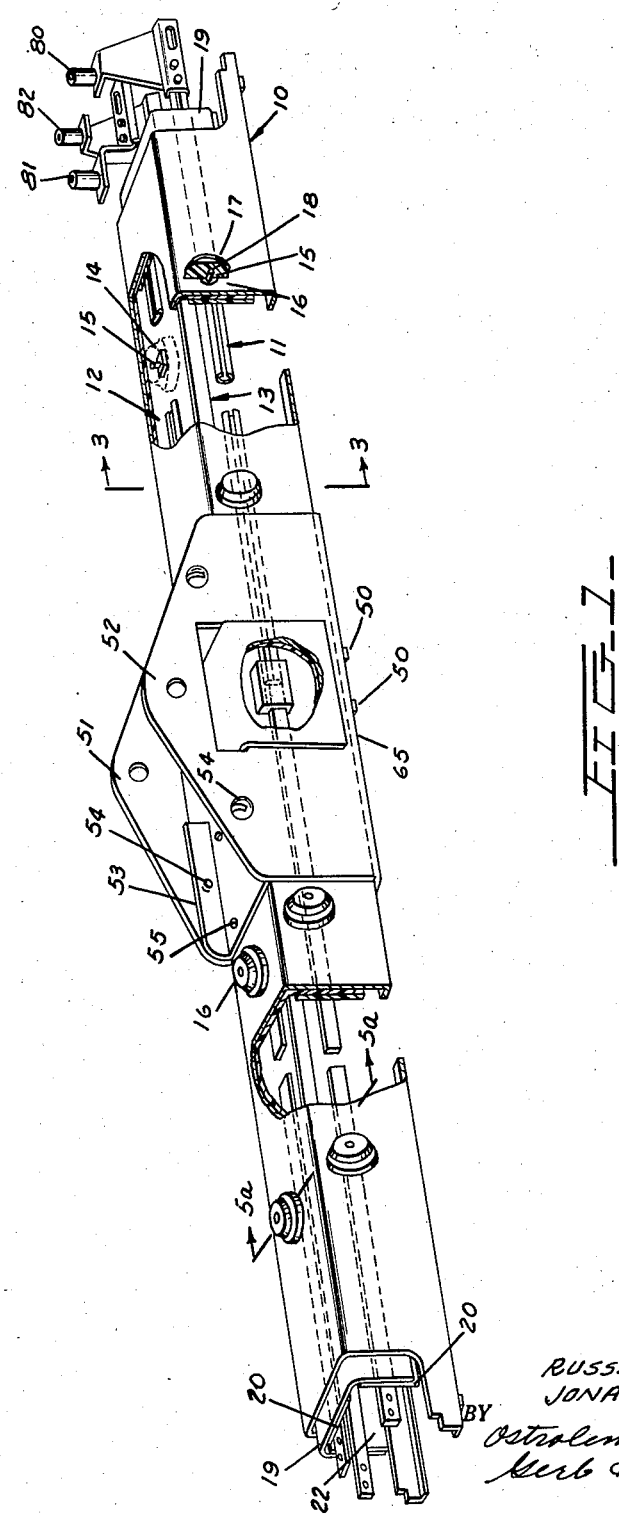

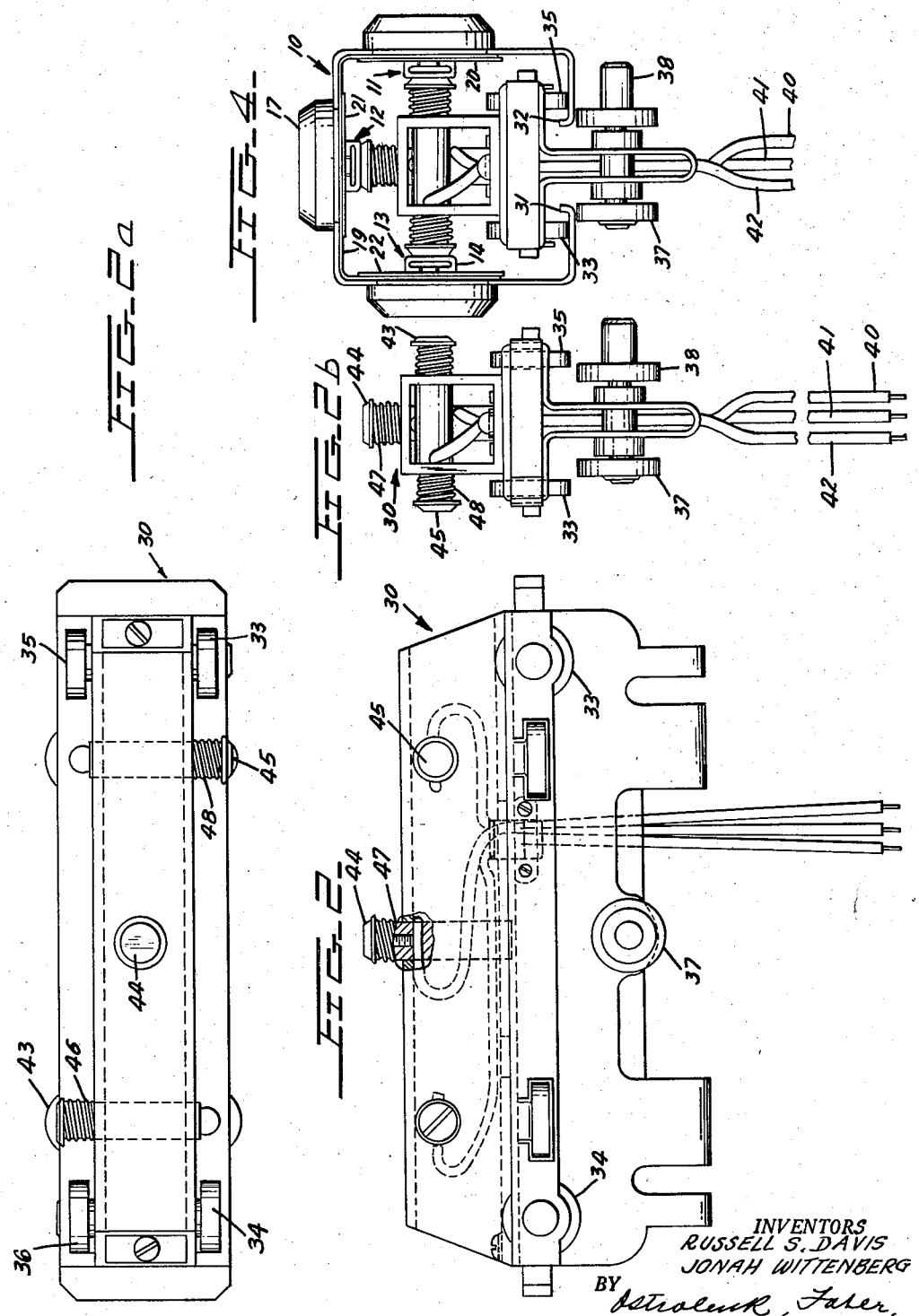

2,882,356

TROLLEY DUCT WITH FORMED BUS BARS

Russell S. Davis and Jonah Wittenberg, Detroit, Mich., assignors, by mesne assignments, to I-T-E Circuit Breaker Company, Philadelphia, Pa., a corporation of Pennsylvania Application May 4, 1956, Serial No. 582,744

1 Claim. (Cl. 191—23)

Our invention relates to trolley duct, and more particularly to an arrangement wherein formed bus bars are used so that (a) the collector is in engagement with a smooth and continuous surface of the bus bar, and (b) the arrangement simplifies assembly of the entire unit.

A typical trolley duct construction known in the prior art is shown in Patent No. 2,018,846 and a slidable collector for this type of unit is shown in Patent No. 2,018,016, both of which are assigned to the assignee of the instant application.

In the construction of trolley ducts it is desirable to provide two features. The first is an arrangement to utilize the existing housing as a support for the stationary bus bars to thereby reduce the required copper needed for support of these units and the second is to provide bus bars which have a smooth and continuous surface to thereby increase the life of the trolley collector which is in engagement with the surface of the bus bar.

In the prior art arrangement, such as shown in Patent No. 2,018,846, it has been possible to achieve the first of the above noted features wherein the housing is utilized as a support for the bus bars to thereby reduce the amount of copper which is necessary for supporting purposes.

However, the second of the above noted features is not achieved in this prior art arrangement. That is, the prior art structure consists of providing a plurality of threaded openings in the bus bar adapted to receive securing means such as screws, which are passed from the external portion of the housing through openings in the housing to engage the threaded openings in the bus bar.

This arrangement of providing threaded openings in the bus bar has the disadvantage of substantially reducing the effective cross-sectional area of the bus bar thereby necessitating an increase in the cross-sectional area and due to the periodic decrease in the cross-sectional area at the threaded openings could also result in warping and distortion of the conductor. An even more important disadvantage of this prior art arrangement is that the trolley collector does not have a smooth surface of the bus duct to engage since it periodically would have to slide over the threaded openings therein as it was moved along the trolley duct.

Our present invention overcomes the disadvantages of the prior art and still retains the advantages that exist therein. That is, our present invention enables the use of the housing as a support for the bus bars and also at the same time provides both a uniform cross-sectional area of the conductor as well as providing a smooth continuous surface of the bus bar which will be engaged by the trolley contactor.

Basically, our invention provides a formed bus bar having a C-shaped cross-sectional area. Slidable inserts, containing securing means such as screws, are contained within the space defined by the formed bus bar. Thus, with this arrangement the insert and its threaded extension, which extends from one surface of the bus bar, permits the opposite surface to be smooth and continuous and also permits the bus bar to be of uniform cross-sectional area throughout. Thus, with our invention it is not only possible to provide a continuous smooth surface of the bus bar for the collector, but also since the securing and connection of the bus bar is achieved by means of inserts rather than by tapped openings within the bus bar, it is now possible to substantially reduce the cross-sectional area of the bus bar without loss of strength and without substantially reducing the conductivity of the bus bar.

In the prior art construction such as shown in Patent 2,018,846, wherein tapped openings are provided in the bus bar, it is essential to have exact register between the openings in the housing and the tapped openings in the bus bar. Thus, it is necessary to space the tapped openings of the bus bar a distance equal to the spacing of the openings in the housing. However, with our novel arrangement the inserts for the formed bus bar are slidably captured within space provided by the bus bar. Thus, the inserts can be slidably positioned so that they are registered with the predetermined openings in the housing. Hence, the accuracy, heretofore required, in ensuring that the spacing between the tapped openings of the bus bar is equal to the spacing of openings in the housing, is eliminated.

In the prior art construction wherein the bus bar is provided with tapped openings, the initial threaded engagement between the threaded securing means passed through the opening of the housing and into threaded engagement with the openings of the bus bar, fixed the bus bar in position and does not permit longitudinal adjustment of the bus bar. That is, even though the bus bar is merely held in place it is not possible to reposition the bus bar with respect to the housing. In contradistinction our novel arrangement, by the utilization of inserts in the formed bus bar, permits the bus bar to be held by the securing means although it is not then rigidly secured in position. That is, even though the threaded inserts are passed through the openings in the housing it is possible, prior to the time that the threaded buttons on the exterior of the housing are tightly fastened thereto, to slide the conductor with respect to its insert longitudinally along its axis. That is, during the assembly of the bus bar when the bus bar is held in position against transverse movement it can nevertheless be moved longitudinally to thereby place it in abutment with its aligned bus bars in the adjacent section of the duct section. After the bus bar has been both transversely and longitudinally positioned the threaded button can be rotated so that the bus bar is secured in both a transverse and longitudinal direction due to the frictional engagement between the bus bar and the insert.

Thus, in the prior art method wherein the bus duct was rigidly secured to the housing, inaccuracy of one or both of the adjacent housing units can result in a gap between adjacent aligned bus bars. However, with our present invention this disadvantage is eliminated since the bus bars, during the assembly, can be moved along their longitudinal axes to compensate for any possible inaccuracy in the sub-sections. However, after the adjacent bus bars have been longitudinally moved so that they abut each other, the bus bars are securely positioned and cannot thereafter be moved until the threaded buttons on the exterior of the housing are loosened.

In the tapped bus bar arrangement of the prior art, it has been necessary to provide an external button with a threaded extension such as a screw to pass through openings of the housing into threaded engagement with the tapped openings in the bus bar. This required that the insulating button, which held the threaded securing means, had to be sealed. In contradistinction, our invention provides an arrangement wherein the threaded securing means extends from the insert of the bus bar through the housing to the exterior thereof. Thus, the insulating button, which has a threaded opening to receive the threaded extension, need not be sealed.

Accordingly, an object of our invention is to provide a trolley duct wherein formed bus bars are utilized in which a smooth continuous surface of the bus bar is provided for the trolley collector event though the housing serves as a support for the bus bar.

Another object of our invention is to provide a trolley duct construction in which the bus bars have a uniform cross-sectional area thereby reducing the quantity of copper required for the system while still utilizing the housing as a support for the conductors.

Another object of our invention is to provide a formed bus bar construction for trolley duct wherein warping and distortion of the bus bar is at a minimum.

Another object of our invention is the provision of an industrial trolley duct using bus bars having C shaped cross-sectional area whereby a smooth and uninterrupted surface is provided for contact with the trolley collector.

Another object of our invention is to provide a formed bus bar construction wherein slidable inserts are utilized so that these units can be slidably positioned to register with openings in the housing.

Another object of our invention is to provide a bus bar construction providing inserts which are slidably captured within the space defined by the bus bar to thereby facilitate the registry of the insert and the opening of the housing during assembly.

A still further object of our invention is to provide a formed bus bar wherein the inserts, although holding the bus bar to prevent transverse movement thereof during assembly, permit the bus bar to be longitudinally positioned so that it will abut its adjacent bus bar in the adjacent section of the trolley duct.

Another object of our invention is to provide a trolley duct arrangement wherein the bus bar, during the assembly operation, can be longitudinally positioned even though it's temporarily held in place to restrict its transverse motion.

Another object of our invention is to provide a formed bus bar arrangement for industrial trolley duct in which the inserts, even though they are passing through openings in the housing to prevent transverse movement of the bus bar, permit longitudinal adjustment of the bus bar.

Still another object of our invention is to provide a trolley duct structure wherein threaded extensions are slidably secured to bus bars and extend through the housing to the exterior portion thereof thereby eliminating the necessity of sealing the insulating button on the external portion of the housing.

Another object of our invention is to provide an arrangement wherein the exterior button of the housing of the trolley duct merely receives a threaded extension which is slidably captured in the bus bar thereby eliminating the necessity of providing sealing compound for the button.

These and other objects of our invention will become apparent from the following description of the drawings in which:

Figure 1 is a perspective view, partially cut away, of two sections of trolley duct jointed to each other. The left hand portion illustrates the prior art arrangement and the right hand portion incorporates one embodiment of our present invention.

Figure 2 is a side view of a trolley collector which can be used in conjunction with the trolley duct construction illustrated in the perspective view of Figure 1.

Figure 2A is a top view of the trolley collector of Figure 2.

Figure 2B is an end view of the trolley collector of Figure 2.

Figure 3 is a cross-sectional view taken in the direction of the arrows 3—3 of Figure 1.

Figure 4 is a cross-sectional view similar to Figure 3 showing the manner in which the trolley collector of Figure 2 operates therewith.

Figure 5A is a view taken in the direction of the arrows 5a—5a of Figure 1 and illustrates the prior art arrangement.

Figure 5B is a cross-section taken through the center of an insulating button of Figure 3 transverse to a bus bar and illustrates the manner in which the formed bus is held against the housing.

Figure 6 is an exploded perspective view of the formed bus bar used in our invention and illustrates the captured slidable inserts for connecting the bus bar to the channel and also illustrates the end connecting means whereby adjacent bus bars are electrically tied to each other.

Trolley duct is used in those installations where it is desirable to continuously supply electrical energy to loads which may be moved around. Thus, in the installation, it is necessary to have stationary bus bars which are rigidly positioned so that a trolley collector, which is connected to the load, can make sliding engagement with the stationary bus bars. Figure 1 is a perspective view of the stationary members of the trolley duct.

As best seen in Figures 1 and 3, a channel or housing 10 is provided as a support and housing for the bus bars 11, 12 and 13. In this figure we have illustrated a trolley duct for a three phase circuit wherein the bus bars 11, 12 and 13 represent phases A, B and C, respectively. In the event it is desirous to have a construction for a single phase circuit, the bus bar 12 can be eliminated so that only bus bars 11 and 13 remain.

The channel or housing 10 is preferably made of metal since it must serve the function of supporting the bus bars as well as provide a rail guide for the trolley collector. The trolley duct is initially constructed in a plurality of unit sections, two of which are illustrated in Figure 1. The channel 10 of each unit section has a substantially square cross-sectional configuration as is illustrated in Figure 3. The bottom portion of the channel 10 is provided with upturned sections 31 and 32 to thereby form a U shaped rail within which rollers of the trolley collector are guided and maintained. The remaining walls of the channel 10, namely the two side walls and the top, are used as supports for the bus bars 11, 12 and 13. As will hereinafter be more fully explained, there are a plurality of openings 16 existing in the side and top walls of the channel 10. The number of openings 16 in the channel 10 correspond in number to the number of securing inserts in the bus bars 11, 12 and 13.

The trolley collector 30 which is guided in the rails formed by the upturned sections 31 and 32 is illustrated in Figures 2, 2A and 2B wherein the trolley is provided with a set of rollers 33, 34, 37 on one side and guide rollers 35, 36 and 38 on the opposite side. The upper rollers 33, 34 and 35, 36 are contained respectively within the U shaped grooves defined by the upturned sections 31, 32 as seen in the combined view of Figure 4. The lower set of rollers 37, 38 engage the lower surface of the channel 10. The conductors such as 40, 41 and 42 carry three phase current to a load to be supplied with electrical energy from the bus duct seen in Figure 1. Thus, it is necesary to provide a sliding electrical contact between the conductors 40, 41, 42 and the bus bars 11, 12 and 13 of the bus duct section. This is achieved by providing the trolley duct collector with biased sliding contacts such as 43, 44, and 45 which are connected respectively to the conductors 40, 41 and 42. Each of the contacts 43, 44 and 45 has a biasing spring such as 46, 47, 48 associated therewith to bias the contact outwardly from the trolley collector 30 and into frictional engagement with its respective bus bar.

The bus bars 11, 12 and 13 are formed so that they have a substantially C shaped cross-sectional area as is best seen in Figure 3. Thus, there is effectively a slot extending along the entire length of each of the bus bars for the purpose hereinafter described. Head bolts such as 14 are captured within the space or slot defined by the bus bar. A threaded extending member 15 is rigidly secured to the head bolt 14 and extends through the opening in the bus bar.

The head bolt 14, although captured within the space defined by the bus bar, is longitudinally slidable with respect to the bus bar. The channel or housing 10 is provided with periodic openings 16. Thus, the head bolts 14 can be slidably moved along the bus bar 11 until the threaded extension 15 is in register with the opening 16 in the housing or channel 10. An insulating button 17 is provided with a blind hole 18. That is, the threaded opening 18 in the insulating button 17 extends through only one surface. Thus, the button 17 can be brought into threaded engagement with the threaded extension 18 of the head bolt 14 associated with the bus bar to thereby hold the bus bar in position. By the unique construction of providing a formed bus bar, it is possible to provide an arrangement wherein the surface of the bus bar on the interior of the channel 10 is a smooth continuous surface.

Since the bus bars 11, 12 and 13 will all be at different potentials and since it is desirable to provide the housing 10 of metal, it is necessary to provide adequate insulation between the bus bars 11, 12 and 13 and the channel 10. To this end, a fibre channel 19 is positioned along the entire interior of the channel 10 and is sandwiched between the bus bars 11, 12 and 13 and the channel 10. Layers of phenolic insulation, such as 20, are also positioned between the conductors 11, 12 and 13, respectively, and the channel 10. Both the fibre channel 19 and the phenolic strip insulators 20, 21 and 22 are provided with periodic openings which are not registered with each other and not registered with the periodic openings such as 16 in the channel 10. Thus, the threaded extension 15 passes through the openings in the phenolic insulating strips such as 20, the fibre channel 19, into opening 16 in the housing so that the threaded opening 18 of the insulating button 17 can be brought into threaded engagement therewith.

Initially, when the insulating button 17 is brought into threaded engagement with the threaded extension 15, the bus bars 11, 12 and 13 are merely held in position so that they do not have transverse movement. However, the head bolts 14, although captured within the space defined by the bus bar, are nevertheles slidable with respect thereto so that the bus bars can still be moved longitudinally. Thus, when the right and left hand sections such as seen in Figure 1 have been connected to each other, it is possible to longitudinally adjust the bus bars so that they will be brought into abutment with their associated bus bars in the adjacent sections. Thereafter, the insulating button can be rotated so as to make a tight connection and therefore rigidly hold their respective bus bars against the interior of the channel 10.

As best seen in Figure 5B, the opening 16 in the channel 10 is considerably larger than the outside diameter of the threaded extension 15. This arrangement is provided to ensure adequate insulation between the bus bars and the channel. The insulating button 17 is constructed with a step so that the surface through which its threaded opening 18 extends has an outside diameter which is equal to the inside diameter of the opening 16 in the channel 10. Thus, as the insulating button 17 is threadably secured to the extension 15, the stepped portion will enter the opening 16 in the channel 10 as best seen in Figure 5B.

As can be seen in Figure 5B, the threaded opening 18 within the insulating knob 17 extends from only one surface thereon. Therefore, the upper surface of the nut or button 17 has no openings extending therethrough. That is, with our novel construction, the threaded extension 15 is captured within the slot of the bus bar and hence extends from the interior of the channel to the exterior thereby enabling the utilization of this construction. In the prior art arrangement wherein the bus bar is provided with a plurality of tapped openings it was necessary to provide an arrangement in which the threaded securing means extended from the exterior to the interior of the channel. Thus, the insulating button, such as 17, had to have an opening which extended through at least two parallel surfaces so that the screws, such as 15a seen in Figure 5A, could be properly positioned. Thus, with this prior art arrangement of Figure 5A it was necessary to provide a sealing compound in the opening which received the screws 15a in order to provide adequate insulation. As can best be seen by comparison of Figures 5A and 5B, the necessity for sealing compound in the insulating button is completely eliminated in our novel construction.

As has heretofore been noted, the trolley duct is initially constructed in unit sections, two of which are seen in Figure 1. Thus, the various unit sections can easily be shipped from the factory and the unit sections thereafter are secured to each other at the point of installation. The manner in which unit sections are secured to each other is illustrated in Figure 1. There it will be seen that each of the unit sections of the channel 10 is provided with a protrusion such as 50 extending from the lower surface thereof. Side plates such as 51, 52 cooperate with a top plate 53 and are utilized to secure unit sections to each other. Each of the side plates 51, 52 has a substantially L shaped cross-section with openings in the horizontal leg which receives the protrusions such as 50 from the channel 10. The top plate 53 has a substantially U shaped configuration and is placed on top of the aligned adjacent channels 10 between the side plates 51 and 52. The side plates 51, 52 are secured to the U shaped top plate 53 by securing means such as screws 54. The top plate 53 has a plurality of tapped openings to receive screws, such as 55, which are threadedly engaged therewith and pass through the top plate 53 and into engagement with the top surface of the channel 10. Thus, the entire assembly comprised of the side plates 51, 52 and the top plate 53 move upwardly as the screws 55 are threaded into the tapped openings of the plate 53 and engage the top surface of the channel 10. Thus, the lower legs of the side plates 51 and 52 are drawn against the bottom of the channel 10 and are held against movement due to the positioning of the protrusions 50 of the channel 10 within the openings of the side plates 51 and 52.

The general application of the bus duct is to have it suspended from the upper portion of a room so that the trolley collector 30 can be easily moved within the bus duct section while the workmen manipulate the tool below the bus duct. To this end, the bus duct sections can be secured to the ceiling by means of the side plates 51 and 52. As illustrated in Figure 1 the conductors 11, 12 and 13 have terminal means 80, 81 and 82 by which electrical energy is supplied to the bus bars 11, 12 and 13. Thus, electrical energy is supplied through the terminals 80, 81 and 82 through the bus bars 11, 12 and 13, through the trolley collector 30 by means of the sliding contacts 43, 44 and 45 to the conductors 40, 41 and 42 to a load.

Since each of the unit sections has its own bus bars, it is necessary to provide an arrangement wherein the bus bars from one unit section can be electrically connected to their associated bus bars in alignment therewith existing in the adjacent unit sections. The manner in which aligned adjacent bus bars of adjacent unit sections are joined to each other is illustrated in Figure 1. A detailed perspective view of the units which permit this electrical connection is illustrated in the exploded perspective view of Figure 6. There it will be seen that a metallic insert such as 60 having two tapped openings 61 and 62 is positioned within the slot of each of the bus bars. These inserts 60 are positioned at the ends of the bus bars and the bus bar is crimped at 63 and 64 so as to not only capture the insert 60 in a transverse direction but also to capture the insert in a longitudinal direction with respect to the bus bar 11. Thus, an inset such as 60 is associated at the ends of all of the formed bus bars. The connecting bracket 65 between aligned adjacent bus bars is also illustrated in Figure 6. The connecting bracket 65 is comprised of a U-shaped member 66, a guide plate 67, and securing screws 68. The U-shaped member 66 is a heavy conducting member having a cross-sectional area substantially equal to the cross-sectional area of the bus bar since it is the unit which actually carries the unit from one bus bar to its aligned adjacent bus bar. Both the U-shaped conducting member 66 and the top plate 67 have two openings, each of which is associated with one of the bus bars to be connected. The major portion within the opening of the top plate 57 has a diameter which is equal to the smallest diameter of the threads in the screws 68. Thus, after the screws 68 are inserted in the opening 69 they can be moved to the narrow portion 70 of the slots within the plate 67 and held in position. These screws 68 extend not only through the opening 70 but also to the opening 71, for engagement with the tapped openings 61, 62 of the metal insert 60 of the bus duct.

Thus, a convenient arrangement is provided for electrically connecting together aligned adjacent bus bars. It will be noted that since the mechanical connection between the connector 65 and the bus bars is by means of a tapped opening within an insert of the bus bars, that this arrangement could also be used to interconnect a formed bus bar such as seen in Figure 6 with a bus bar of the prior art having tapped openings such as seen in Figure 5A and the left portion of Figure 1. Thus, screws such as 68 extend through the connector 65 to the tapped opening within the bus bars.

In the foregoing, we have described our invention only in connection with preferred embodiments thereof. Many variations and modifications of the principles of our invention within the scope of the description herein are obvious. Accordingly, we prefer to be bound not by the specific disclosure herein but only by the appending claim.

We claim:

A trolley duct comprising an elongated channel and a plurality of elongated bus bars secured to said channel and positioned therein; said bus bars having their longitudinal axes extending substantially parallel to the longitudinal axis of said channel; said channel having a plurality of openings arranged in longitudinally extending rows with each of said rows being individual to one of said bus bars; each of said bus bars being of a uniform C-shaped cross-sectional area throughout the lengths thereof; a plurality of slideable inserts disposed within the space defined by the C-shape of said bus bars; said C-shape being effective to prevent withdrawal of said inserts from said space by moving said inserts in directions transverse to the longitudinal axis of their associated bus bar; each of said inserts having a threaded extension extending from said space and positioned at substantially right angles to the longitudinal axis of its associated bus bar; insulating sheet means positioned adjacent to the interior surface of said channel and having openings aligned opposite said channel openings; insulating buttons comprising a first section too large in size to be received by said channel openings and a second section small enough in size to be entered into said channel openings; each of said buttons having a threaded opening extending only partially therethrough; each of said threaded extensions extending from the interior of said channel through one of said channel openings and its said associated aligned opening in said insulating sheet means; each of said buttons being in threaded engagement with its associated threaded extension with the first section thereof being positioned externally of said channel and the second section thereof being entered into the associated channel opening thereby drawing said bus bars snugly against said insulating sheet means to thereby enable said channel to serve as a support for said bus bars and prevent movement thereof.

References Cited in the file of this patent

UNITED STATES PATENTS

| | | |
|---|---|---|
| 452,160 | Blackwell | May 12, 1891 |
| 455,339 | Knight | July 7, 1891 |
| 581,368 | Priest | Apr. 27, 1897 |
| 1,998,803 | Collins | Apr. 23, 1935 |
| 2,018,846 | Frank | Oct. 29, 1935 |
| 2,128,135 | Glasgow | Aug. 23, 1938 |
| 2,471,739 | Gregg | May 31, 1949 |
| 2,640,114 | Wehr | May 26, 1953 |